United States Patent [19]

Oshima

[11] Patent Number: 4,960,805

[45] Date of Patent: Oct. 2, 1990

[54] IVORY-LIKE KEY MATERIAL AND A METHOD FOR PRODUCING THE SAME

[75] Inventor: Yutaka Oshima, Shizuoka, Japan

[73] Assignee: Yamaha Corporation, Japan

[21] Appl. No.: 291,054

[22] Filed: Dec. 28, 1988

[30] Foreign Application Priority Data

Dec. 28, 1987 [JP] Japan .................................. 62-335735
Dec. 28, 1987 [JP] Japan .................................. 62-335736

[51] Int. Cl.$^5$ .......................... C08L 7/02; C08L 9/10; C08L 51/02; C08L 89/00
[52] U.S. Cl. ........................................ 524/26; 523/334
[58] Field of Search ...................... 524/25, 26; 523/334

[56] References Cited

U.S. PATENT DOCUMENTS 4,447,268  5/1984  Oshima .
4,508,575  4/1985  Oshima .................................. 428/15

OTHER PUBLICATIONS

Abstract of Japanese Patent No. 57-96046, 6/82, Oshima.
Abstract of Japanese Patent No. 59-52613, 3/84, Oshima.
"CASEIN Its Preparation, Chemistry and Technical Utilization" by E. L. Taque, pp. 152-165.

*Primary Examiner*—Allan M. Lieberman
*Attorney, Agent, or Firm*—Ostrolenk, Faber, Gerb & Soffen

[57] ABSTRACT

In production of a casein-type artificial key material for keyboard musical instruments, fine grains of an elastomer such as polyurethane elastomer are added to a mixture to be kneaded together so that, in the structure of the product, islanded elastomer is uniformly dispersed in the matrix of casein. Inbred brittleness of casein is much improved by inclusion of the elastomer and strong bond between casein and the elastomer well removes the danger of interface separation.

8 Claims, No Drawings

IVORY-LIKE KEY MATERIAL AND A METHOD FOR PRODUCING THE SAME

BACKGROUND OF THE INVENTION

The present invention relates to an ivory-like key material and a method for producing the same, and more particularly relates to production of artificial ivory-like key material of improved mechanical properties used for keyboard musical instruments such as pianos, organs and accordions.

Ivory has long been used for surface covering keyboard musical instruments because of its excellent inbred properties. With the increasing world trend for protection of wild animals, however, supply of natural ivory is now quite limited. As a substitute, use of artificial ivory-like material is widely accepted in production of keys for musical instruments. Casein resin made up of casein hardened with formalin is a typical example. In the case of such a casein-type artificial material, however, the texture of the product is rather poor when compared with natural ivory. In addition, the casein-type artificial material is rather vulnerable to impacts. Further, when a small amount of additives in the form of fine grains are contained in the casein, the material is poor in workability and breakage and cracks are often caused by cutting which is indispensable to production.

In an attempt to make the casein-type artificial material closer to natural ivory, it is proposed in Japanese Patent Opening Sho. No. 57-45592 to add a hydrate inorganic filler such as aluminium hydroxide to powdery casein before hardening by formalin. Inclusion of hydrate inorganic filler provides the product with moderate hygroscopicity to absorb sweat on the musical instrument player's fingers. The product also has comfortable smoothness with moderate abrasion resistance to provide excellent finger touch. Its deep translucent tint much improves the appearance.

Despite these advantages, addition of such an inorganic filler tends to develop contamination at the interfaces between casein and additives to lower the commercial value of the product.

SUMMARY OF THE INVENTION

It is the object of the present invention to provide a casein-type artificial material with reduced contamination, high impact strength and rich workability.

In accordance with the first aspect of the present invention, fine grains of elastomer is dispersed in a matrix of casein resin.

In accordance with the second aspect of the present invention, a mixture of casein with elastomer is kneaded together in the presence of water and the kneaded mixture is immersed in a formalin bath for hardening.

DESCRIPTION OF PREFERRED EMBODIMENTS

In accordance with one embodiment of the present invention, a mixture of casein with elastomer is kneaded together in the presence of water and the kneaded mixture is immersed in a formalin bath for hardening.

Casein powder preferably used for this invention has an average diameter in a range from 10 to 500 $\mu$m, more preferably from 10 to 100 $\mu$m. Generally, casein is a mixture of like proteins and belongs to the phosphoprotein group. Its molecular weight is in a range from 70,000 to 380,000.

Casein usable for the present invention is most generally obtained from milk of animals such as cows, horses and goats. In particular, rennet casein obtained by coagulation with enzyme rennin and acid casein obtained by coagulation with acid are preferably used. Rennet casein of a huge structure having lots of folded branched chains is most advantageously used.

The elastomer to be mixed with casein comprises hygroscopic elastic macromolecules. For example, polyurethane, polyamide, polyacrylic acid ester, polyester, polyether, polymethacrylate, polyvinyl acetate, polyvinyl chloride, polyacrylonitrile, polyvinyl ether, synthetic rubber emulsions such as chloroprene, NBR and SBR, polyvinyl alcohol, polyvinyl pyrrolidone, polyethylene glycol, polyacrylic amide, polymethyl cellulose, grafted starch, cellulose and natural rubber latex are usable. The molecular weight and properties are properly chosen in accordance with use of the product.

Preferably, the elastomer should be similar in molecular structure to the casein chosen. That is, the elastomer should contain polypeptide-like chains. For example, polyurethane or polyamide of a molecular weight in a range from 5,000 to 100,000, more preferably from 10,000 to 50,000, is used.

The elastomer may be added to casein in the form of solution, emulsion, powder or grains.

Preferably 1 to 50 parts by weight of, more preferably 2 to 30 parts by weight of elastomer should be added per 100 parts by weight of a mixture of the elastomer with casein. Most preferably, 4 to 23 parts by weight of elastomer should be added per 100 parts by weight of the mixture. No appreciable improvement in impact strength, workability and durability can be observed below the lower limit. Any content ratio above the upper limit would disenable shaping after kneading and lower the hardness after shaping.

Casein, the elastomer and water may be mixed and kneaded either concurrently or sequentially.

In addition to these component, the product may contain other additives such as pigments, dyestuffs, plasticizers, smoothers, hardeners, antioxidants and antistatic agents.

For colour adjustment, pigments such as titanium oxide, zinc oxide and lithopones as well as acid dyes may be added too. Preferably up to 10 parts by weight, more preferably 0.01 to 10 parts by weight, of a colouring agent or agents should be added 100 parts by weight of the kneaded mixture. Most preferably, 0.2 to 1 parts by weight of a colouring agent or agents should be added.

Inclusion of the above-described additives lowers the tackiness of casein caused by addition of the elastomer emulsion for easier shaping after kneading.

Preferably 5 to 50 parts by weight, more preferably 10 to 40 parts by weight, of water per 100 parts by weight of casein is added to the mixture of the above-described component for kneading. After kneading, the mixture is left for 5 to 24 hours at the room temperature for swelling of casein.

The kneaded mixture is then shaped by means of extrusion moulding, pressing after rolling, or pressing. Extrusion moulding is preferably carried out under a pressure from 100 to 200 Kg/cm$^2$ at a temperature from 20° to 100° C. The processing temperature has an upgrade from the base of the cylinder to the die of an extruder. Pressing is preferably carried out under a pressure from 100 to 200 Kg/cm² at a temperature from 85° to 95° C.

Next, a shaped mixture is immersed in a formalin bath of 3 to 10% concentration at room temperature for hardening of casein. Immersion period varies depending on the dimensions of the shaped mixture. In the case of a planar configuration, it takes 6 days for 3 mm thickness, 16 days for 5 mm thickness and 50 days for 10 mm thickness.

After complete hardening of casein, the shaped mixture is heated at a temperature from 20° to 45° C. to dryness and subjected to proper finish treatments such as cutting, grinding and polishing.

In the composition of the ivory-like key material in accordance with the present invention, fine grains of elastomer are dispersed in a matrix of casein resin. The average particle diameter of the dispersed fine grains of the elastomer should preferably be in a range from 0.1 to 90 μm, and more preferably from 0.5 to 20 μm.

The key material may be used either solely or in combination with a wooden base. In the latter case, the key material is shaped to a thickness from 0.5 to 3 mm, and is applied on the wooden base by a adhesive. Although the key material is most preferably used for white keys, it may also be used for black keys after proper colouring.

When the mixture of casein, elastomer and water is kneaded together, the elastomer is grained finely and dispersed in the kneaded mixture. Such dispersion is further promoted uniformly when the elastomer is hygroscopic.

In particular when the molecular structure of the elastomer is similar to that of casein, the fine grains of the elastomer exhibit excellent affinity at their interfaces with casein to promote bonding. In addition, bridging takes place between casein and the elastomer during hardening of the kneaded mixture by the formalin to further promote bonding between the two component.

After the hardening, the shaped mixture has a so-called matrix-island structure. Hardened casein forming the matrix provides the product with high mechanical strength whereas the elastomer forming the islands provides the product with high flexibility.

In accordance with the present invention, the inbred brittleness of casein is much improved by dispersion of elastomer to raise shock resistance without lowering the mechanical strength of the product. Increased flexibility of the product reduces the danger of crack and/or breakage which otherwise frequently occur in the after-treatment. Thanks to high bonding at interfaces between casein and elastomer, the possibility of contamination is significantly reduced. Since the casein matrix and elastomer islands behave to expand and contract in a same way at absorption and discharge of sweat, no stress concentration takes place at their interfaces to cause deterioration of the matrix.

In accordance with another embodiment of the present invention, a mixture of casein, elastomer and inorganic filler is kneaded together in the presence of water and the kneaded mixture is immersed in a formalin bath for hardening.

Hydrate fillers such as aluminium hydroxide, alumina hydrate, calcium sulfate hydrate, calcium silicate, calcium hydroxide, magnesium hydroxide, basic magnesium carbonate, aluminium silicate, magnesium silicate and silicic acid are usable for the inorganic filler. Non-hydrate fillers such as calcium phosphate, silicon dioxide, alumina and barium sulfate are also usable for the inorganic filler.

Preferably 1 to 200 parts by weight, more preferably 1 to 50 parts by weight, of inorganic filler should be added per 100 parts by weight of kneaded mixture. Most preferably, 2 to 30 parts by weight should be added. Any content ratio below the lower limit would disenable smooth shaping due to too high clinginess whereas any content ratio above the upper limit would mar flexibility of the product.

The average particle diameter of the dispersed inorganic filler should preferably be in a range from 0.5 to 5 μm, and more preferably from 1 to 2 μm.

The addition of the inorganic filler raises hardness of the product, thereby improving abrasion rasistance.

DESCRIPTION OF EXAMPLES

Example 1

A mixture having the composition shown in Table 1 was kneaded together in a mixer and left for 24 hours at 20° C. for swelling of casein. The kneaded mixture was then filled in a mould and shaped by a hot press at 95° C. under 120 kg/cm². The shaped mixture was immersed in a formalin bath of 5% concentration. The obtained key material was subjected to various tests.

TABLE 1

| (Content ratio: wt. %) | |
|---|---|
| Rennet casein 30 mesh or smaller, produced in New Zealand) | 84.8 |
| Polyurethane elastomer (molecular weight was several ten thousands, produced by Hodogaya Chemical) | 9.3 |
| Titanium oxide | 0.9 |
| Water | 5.0 |

As a result of microscopic observation at 200 magnification, it was confirmed that substantially spherical grains of polyurethane elastomer of 1 to 20 μm diameter were relatively uniformly dispersed in casein matrix.

For comparison, a key material was prepared in the same way but without addition of the polyurethane elastomer, and subjected to like tests. The results of the tests are shown in Table 2.

TABLE 2

| Test items | Sample for comparison | Sample of the invention |
|---|---|---|
| Specific gravity | 1.35 | 1.30 |
| Impact strength (kg · cm/cm²) | 20~30 | 60~80 |
| Tension characteristics | | |
| Tensile strength (kg/mm²) | 10 | 7.5 |
| Modulus of elasticity (kg/mm²) | 400 | 300 |
| Elongation (%) | 6 | 7.5 |
| Pencil hardness | | |
| initial | 2H | 2H |
| after 5 min. immersion | 5B | 2B |
| after 10 min. immersion | ≦6B | 5B |
| Durability | | |
| heat/cool test | 100% crack/2 cycle | no crack/10 cycle |
| dry/wet test | no crack/10 cycle | no crack/10 cycle |
| sweat test | interface separation | no separation per |

TABLE 2-continued

| Test items | Sample for comparison | Sample of the invention |
|---|---|---|
| | per 1000 cycle | 5000 cycle |

Note
Pencil Hardness: Each sample was immersed in water of 23° C. to observe change in hardness. Hardness given in the hardness standard for pencils.
Heat/cool test: Heating at 50° C. and cooling at −20° C. were alternately repeated. A sample of 1.5 mm thickness with notches was bonded to a wooden base.
Dry/wet test: 20% drying at 35% RH and 95% wetting at 35% RH were alternately repeated. A sample of 1.5 mm thickness with notches was bonded to a wooden base.
Sweat test: Immersion to an artificial wet bath and drying by hot air were alternately repeated.

It is clearly learned from the data in Table 2 that the product of the present invention is highly improved in flexibility, impact strength and durability.

Example 2

A mixture having the composition shown in Table 3 was processed in a manner same as that in Example 1.

TABLE 3

| (Content ration wt. %) | |
|---|---|
| Rennet casein (30 mesh or smaller, produced in New Zealand) | 78.9 |
| Polyurethane elastomer (molecular weight was several ten thousands, produced by Hodogaya Chemical) | 6.6 |
| Aluminium hydroxide | 8.8 |
| Titanium oxide | 0.7 |
| Water | 5.0 |

Microscopic observation showed a result the same as that in Example 1.

For comparison, a key material was prepared in the same way but without addition of polyurethane elastomer, and subjected to like tests. The results of the tests are shown in Table 4. The tests were conducted in the same manner as in Table 2.

TABLE 4

| Test items | Sample for comparison | Sample of the invention |
|---|---|---|
| Specific gravity | 1.46 | 1.35 |
| Impact strength (kg · cm/cm²) | 10~15 | 40~60 |
| Tension characteristics | | |
| Tensile strength (kg/mm²) | 8.5 | 8.5 |
| Modulus of elasticity (kg/mm²) | 550 | 350 |
| Elongation (%) | 2.5 | 5.0 |
| Pencil hardness | | |
| initial | 3H | 2H |
| after 5 min. immersion | F | HB |
| after 10 min. immersion | 2B | 3B |
| Durability | | |
| heat/cool test | 100% crack/2~5 cycle | no crack/10 cycle |
| dry/wet test | no crack/10 cycle | no crack/10 cycle |
| sweat test | interface separation per 400 cycle | no separation per 5000 cycle |

It is again clearly learned from the data in Table 4 that the product of the present invention is highly improved in flexibility, impact strength and durability.

I claim:

1. An ivory-like key material comprising fine grains of hydroscopic elastic macromolecule dispersed in a matrix of casein resin, wherein said macromolecule is present in an amount of 1 to 50 parts by weight of the total of said casein and macromolecule and wherein said macromolecule is selected from the group consisting of polyurethane, polyamide, polyester, polyether, polyvinyl chloride, polyacrylonitrile, synthetic rubber emulsion, polyvinyl alcohol, polyvinyl pyrrolidone, polyethylene glycol, polymethyl cellulose, grafted starch, cellulose and natural rubber latex.

2. An ivory-like key material as claimed in claim 1 in which said macromolecule is polyurethane elastomer.

3. An ivory-like key material as claimed in claim 1 or 2 further comprising inorganic filler dispersed in said matrix of casein resin.

4. An ivory-like key material as claimed in claim 3 in which the content ratio of said inorganic filler is in a range from 1 to 200 parts by weight per 100 parts by weight of said ivory-like material.

5. An ivory-like key material as claimed in claim 2 in which the average particle diameter of said fine grains of macromolecule is 20 μm or smaller.

6. An ivory-like key material as claimed in claim 4 in which the said macromolecule is present is in a range of from 4 to 23 parts per 100 parts by weight of the total of said casein and said fine grains of hydroscopicelastic macromolecule.

7. An ivory-like key material as claimed in claim 1 in which said macromolecule is a polyurethane or polyamide having a molecular weight of 5,000 to 100,000 and a particle size of 0.1 to 90 microns and is present in an amount of 1 to 50 parts per 100 parts by weight of the total of said casein and macromolecule.

8. An ivory-like key material as claimed in claim 7 in which said macromolecule is a polyurethane elastomer having a molecular weight of 10,000 to 50,000 and a particle size of 0.5 to 20 microns and is present in an amount of 2 to 30 parts per 100 parts by weight of the total of said casein and polyurethane.

* * * * *